Nov. 9, 1937.     H. D. GEYER     2,098,703
UNIVERSAL JOINT
Filed May 28, 1937
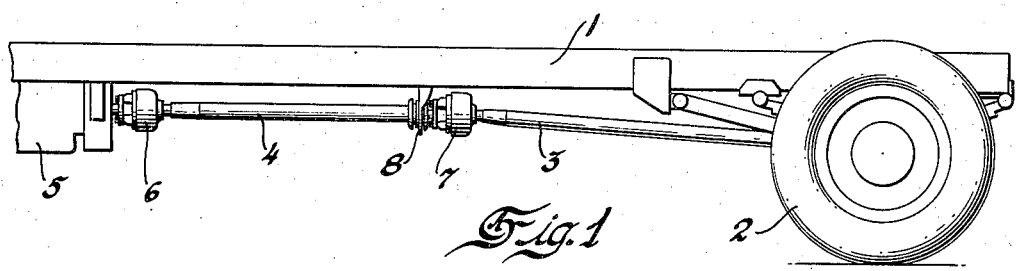
Fig. 1
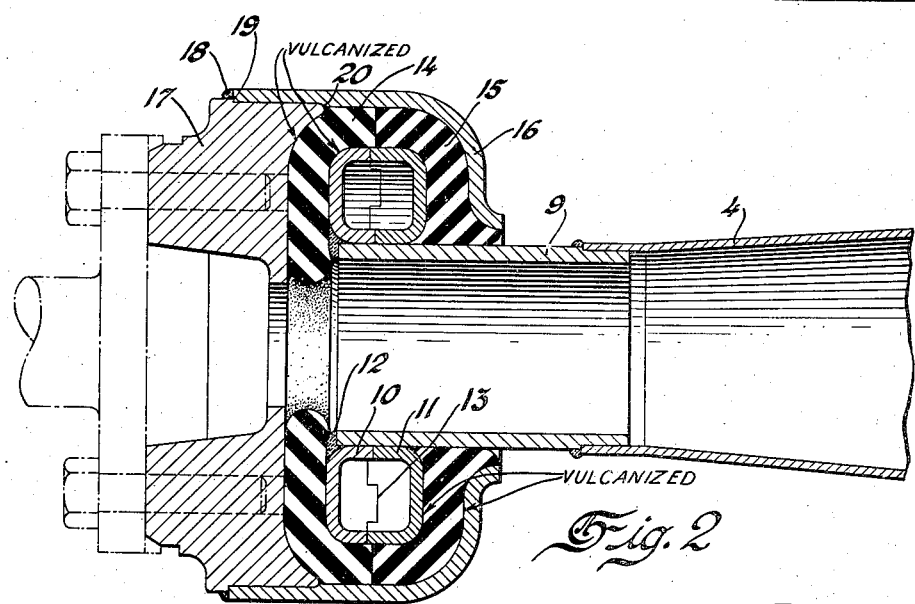
Fig. 2
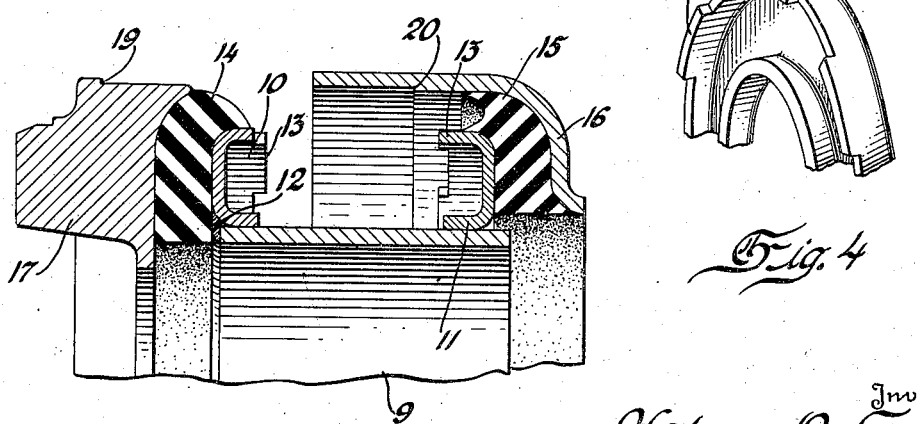
Fig. 3
Fig. 4
Inventor
Harvey D. Geyer
By Blackmore, Spencer & Hurd
Attorneys Patented Nov. 9, 1937

2,098,703

UNITED STATES PATENT OFFICE 2,098,703

UNIVERSAL JOINT

Harvey D. Geyer, Dayton, Ohio, assignor to General Motors Corporation, Detroit, Mich., a corporation of Delaware Application May 28, 1937, Serial No. 145,387

4 Claims. (Cl. 64—11)

This invention relates to universal joint couplings for power transmission shafting and more particularly to a resilient joint wherein a rubber spacer held under compressive stress between driving and driven members transmits the torque and yieldably maintains the parts in centered relation, cushions shock and accommodates misalignment and relative angularity between the driving and driven members.

An object of the invention is to provide an improved design of coupling to facilitate manufacture and assembly at minimum cost, to promote uniformity of product and to eliminate the need for adjustment, lubrication and other attention in use.

The invention will be better understood upon reference to the accompanying drawing wherein Figure 1 is a side elevation of a portion of a motor vehicle embodying the invention; Figure 2 is an enlarged longitudinal sectional view of the improved joint; Figure 3 is a sectional view showing the joint parts prior to final assembly, and Figure 4 is a detail perspective view of one of the elements of the joint.

In the drawing the chassis frame 1 of the vehicle is shown supported through suitable springing upon road wheels 2, the drive axle of which is connected by propeller shaft sections 3 and 4 with the power output shaft of the power plant 5. A universal joint coupling 6 connects the engine output shaft with the forward end of the propeller shaft section 4 and a similar joint 7 connects the adjacent ends of the propeller shaft sections 3 and 4. A frame bracket 8 adjacent the rearmost universal joint 7 affords an intermediate support for the propeller shafting.

Both the couplings 6 and 7 may be of the type shown in the detail views of the drawing wherein the driving element comprises a socket to receive the driven member with a spacer of elastic deformable material, such as rubber. Alternately, the inner member may be the driving element and the outer member the driven element. The innermost member includes a tubular portion 9 to which may be welded or otherwise secured the shaft 4 to be driven. At its forward end it carries an annular rib in the form of a hollow two-piece stamping 10 and 11. The foremost stamping or ring part 10 may be welded, as shown at 12, to the tube 9 and both rings are provided with complementary projections, as shown at 13 in Figure 4, adapted to be interfitted with each other for keying the parts together. Embracing the hollow rib provided by the two part ring 10—11 are a pair of rubber spacers 14 and 15, respectively, and these are enclosed within the socket or outer member which includes separately formed parts 16 and 17. The part 17 of the outer member preferably consists of a forging and contains screw threaded openings to receive fastening bolts by which the coupling is joined to the driving shaft. The other part 16 of the outer member may be in the nature of a stamped cup to be sleeved over the part 17 and secured thereto as by welding at 18. The part 17 is provided with a peripheral shoulder at 19 to engage the end of the member 16 and the member 16 is similarly provided with an internal shoulder at 20 to engage the end of the member 17 and thereby predetermine the fit of the parts and afford a given socket dimension.

In manufacture the joint parts are formed as two separate subassemblies, one including the outer member part 17, the spacer ring part 14 and the inner member part 10 welded to the tube 9. These parts are placed in a suitable vulcanizing mold to cure the rubber and surface bond it to the inner and outer parts. Similarly the spacer ring 15 is secured between the inner and outer members 11 and 16, respectively. In the subassembly unit, as will be apparent in Figure 3, the rubber spaces the metal elements a greater distance apart than in the final assembly, as seen in Figure 2, all according to given specifications for uniformity of product, and when the parts are brought together to interfit the projections 13 of the inner member and seat the shoulders 19 and 20, the rubber spacer rings 14 and 15 are placed under a predetermined compressive stress which causes them to flow slightly and this initial deformation insures a self-centering action of the parts and relieves the surface bond of strain. In use the elasticity of the rubber accommodates angularity between the inner and outer members of the joint. It cushions movement in all directions, including axial, radial and torsional forces, and its surface union with the driving and driven members guards against slippage and displacement.

I claim:

1. In a resilient joint, a two part inner member, a two part socket to receive the inner member, a two part rubber spacer between the inner member and socket, means joining one part of each inner member, the socket and the spacer as a subassembly unit and similarly joining the other parts as a separate unit and means securing the units together with the complementary parts of the inner member and the socket in cooperative relation, and the spacers under an initial deformation stress.

2. In a resilient drive coupling, a pair of inner and outer driving and driven members, elastic deformable material spacing said members and being secured as a unit therewith, a second pair of inner and outer members, elastic deformable material spacing and being secured as a unit to said members and means joining the inner members together and the outer members together and placing said material under initial stress.

3. In combination, two pairs of inner and outer members, elastic deformable material joining and spacing the members of each pair, and means whereby both outer members are joined together and both inner members are joined together and the elastic deformable spacers are placed under initial stress.

4. In a resilient joint, two subassemblies each including a pair of spaced members, and a spacer of elastic deformable material joining said members, and means joining corresponding members of both pairs of members for action in unison.

HARVEY D. GEYER.